US007225126B2

(12) United States Patent
Hirschberg et al.

(10) Patent No.: US 7,225,126 B2
(45) Date of Patent: May 29, 2007

(54) SYSTEM AND METHOD FOR PROCESSING SPEECH FILES

(75) Inventors: Julia Hirschberg, Cranford, NJ (US); Stephen Whittaker, Morristown, NJ (US)

(73) Assignee: AT&T Corp., New York, NY (US)

(*) Notice: Subject to any disclaimer, the term of this patent is extended or adjusted under 35 U.S.C. 154(b) by 984 days.

(21) Appl. No.: 09/879,313

(22) Filed: Jun. 12, 2001

(65) Prior Publication Data
US 2002/0188453 A1 Dec. 12, 2002

(51) Int. Cl.
*G10L 15/26* (2006.01)
*H04M 1/64* (2006.01)

(52) U.S. Cl. ............... 704/235; 379/88.01; 379/88.23
(58) Field of Classification Search ........... 704/235; 379/88.22
See application file for complete search history.

(56) References Cited

U.S. PATENT DOCUMENTS

| 5,568,540 | A  | * | 10/1996 | Greco et al. ............ 379/88.25 |
| 6,219,638 | B1 | * | 4/2001  | Padmanabhan et al. ..... 704/235 |
| 6,327,343 | B1 | * | 12/2001 | Epstein et al. ........... 379/88.01 |
| 6,446,041 | B1 | * | 9/2002  | Reynar et al. .............. 704/260 |
| 6,775,360 | B2 | * | 8/2004  | Davidson et al. ........ 379/88.14 |
| 6,789,060 | B1 | * | 9/2004  | Wolfe et al. ................ 704/235 |
| 6,820,055 | B2 | * | 11/2004 | Saindon et al. ............ 704/235 |
| 6,850,609 | B1 | * | 2/2005  | Schrage ................. 379/202.01 |
| 6,938,065 | B2 | * | 8/2005  | Jain ......................... 709/201 |
| 2002/0103867 | A1 | * | 8/2002 | Schilter ..................... 709/206 |
| 2006/0020673 | A1 | * | 1/2006 | Sorge et al. ............... 709/206 |

* cited by examiner

Primary Examiner—David Hudspeth

(57) ABSTRACT

A system and method for speech file processing which provides users with differentially selectable speech file transcripts which can be sent to one or more other users. The speech files may be voicemail messages from which respective voicemail transcripts are created. The voicemail transcripts are provided in a user selectable format from which users may select non-contiguous portions of the transcript.

23 Claims, 5 Drawing Sheets

FIG. 3

```
"/121/19980206/m0002_0001.wrd"
0        4300000   <pause>  -709.279968
4300000   8000000   hi       -985.438416
8000000   11900000  norm     -862.465698
11900000  12600000  <pause>  -109.502197
12600000  14600000  this     -393.968506
14600000  16100000  is       -312.906494
16100000  19900000  dennis   -711.397949
19900000  20000000  <pause>  -23.782471
20000000  24300000  picture  -1002.252441
24300000  26400000  from     -434.089355
26400000  30900000  kerry    -934.740723
30900000  33500000  i'm      -617.563477
33500000  36300000  <pause>  -459.059570
.
"/121/19980206/m0002_0002.wrd"
0        800000    <pause>  -103.467438
800000    5000000   i'll     -794.972290
5000000   7000000   <pause>  -261.781982
7000000   9300000   try      -615.737061
9300000   10600000  to       -926.002930
10600000  13800000  reach    -748.058838
13800000  15600000  you      -281.607422
15600000  19700000  to       -926.002930
19700000  26200000  describe -1454.250000
26200000  28600000  <pause>  -516.337891
28600000  31800000  jury     -849.795410
31800000  37800000  features -1497.018066
37800000  38200000  <pause>  -820.351562
38200000  43500000  separate -1221.338867
43500000  44500000  it's     -233.091797
44500000  47500000  kerry    -511.095703
47500000  48800000  i'm      -289.250000
48800000  52100000  cable    -889.345703
52100000  55300000  modem    -796.843750
55300000  60900000  system   -1215.606445
60900000  67200000  <pause>  -820.351562
67200000  68300000  i        -284.554688
68300000  70100000  can      -448.887695
```

FIG. 3cont.

```
70100000   71400000   be      -300.851562
71400000   75600000   reached -878.313477
75600000   77400000   at      -326.575195
77400000   81400000   seven   -799.068359
81400000   83200000   eight   -326.339844
83200000   83300000   <pause> -48.970703
83300000   87000000   one     -819.361328
87000000   94200000   <pause> -846.384766
.
"/121/19980206/m0002_0003.wrd"
0        700000    <pause> -64.221443
700000   2800000   two     -580.557251
2800000  6900000   five    -877.404053
6900000  11600000  nine    -860.316040
11600000 13800000  <pause> -234.094727
13800000 17200000  nine    -729.974609
17200000 17300000  <pause> -59.046631
17300000 21100000  one     -703.621582
21100000 22200000  <pause> -170.018555
22200000 21500000  one     -690.791016
25100000 25200000  <pause> -39.735352
25200000 30400000  six     -1118.569336
30400000 32900000  <pause> -235.157227
32900000 35500000  thank   -618.897461
35500000 37600000  you     -496.676270
37600000 41100000  <pause> -393.938477
41100000 44600000  bye     -632.617676
44600000 48400000  <pause> -465.435547
48400000 49100000  .onhk   -286.765625
49100000 49500000  <pause> 201.351562
```

SYSTEM AND METHOD FOR PROCESSING SPEECH FILES

BACKGROUND OF THE INVENTION

The present invention relates to the field of communications and more particularly to a system that allows users to select one or more portions of a speech file transcript and then provide only the selected portions to one or more entities in one or more electronic formats.

Electronic mail and voicemail systems form the foundation of corporate and personal communications. Electronic mail has proven to be even more popular in recent years as the electronic mail systems have become more robust with a variety of useful features like electronic mail return receipts and the ability to attach and transfer files along with the electronic mail messages. Some current hybrid systems also have partially merged the two systems, for example, by allowing a user to check their voicemail through their electronic mail account. This is typically performed by creating an electronic mail version of a voicemail message, such as by having an electronic mail message with a digitized version of the voicemail message attached to the electronic mail message. In this case, the voicemail message may be stored and organized as with other conventional electronic mail messages.

However, none of these prior art systems, electronic mail, voicemail or any hybrid system allows users to selectively capture portions of a voicemail message and forward or send only the selected portions to one or more other users.

Accordingly, it would be desirable to have a system which allows a user to select certain portions of a speech file, such as a voicemail message, in an intuitive manner and then share such selected portions with certain designated parties the user specifies. It would be further desirable to have such an aforementioned system which allows the user to select non-contiguous portions of the speech file and then have only the non-contiguous portions provided to parties the user has specified.

SUMMARY OF THE INVENTION

The present invention is a system and method for processing speech files to allow for selection of one or more portions of the speech file for provision of only the selected portions to one or more parties. In one embodiment of the present invention, the method for processing voicemail messages includes the steps of transcribing a plurality of voicemail messages to produce a plurality of voicemail message transcripts, indexing the plurality of voicemail messages transcripts, providing the voicemail message transcripts to one or more users, receiving at least one selection action from one or more of the users, the at least one selection action identifying at least a portion of one or more of the voicemail message transcripts for delivery to one or more parties identified by the one or more users and providing the selected portion of the one or more voicemail message transcripts to the one or more parties specified by the one or more users.

The present invention includes a graphical user interface for use in browsing, searching and selecting certain portions of the speech files. The graphical user interface facilitates the user's navigation of the user's messages to enable the same person to have access to and the ability to search for information contained in their voicemails and/or electronic mail messages. The user interface may include a window or screen where the transcribed text of the voicemail messages are displayed. Certain message information such as the name of the caller, date of the call and time of the call can be displayed in a separate window or screen.

BRIEF DESCRIPTION OF THE DRAWINGS

FIG. 3 illustrates an exemplary transcript index in accordance with the teachings of the present invention.

DETAILED DESCRIPTION OF THE INVENTION

Figure 1:
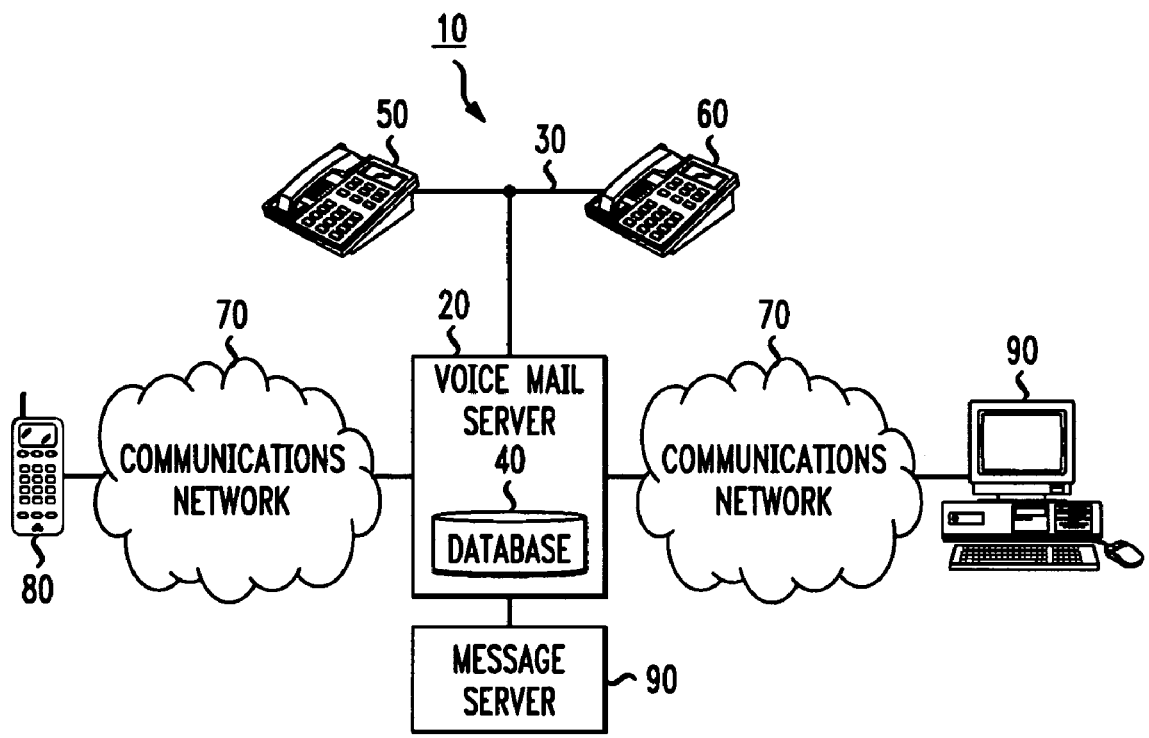
FIG. 1 illustrates a messaging system in accordance with the teachings of the present invention.

Referring to FIG. 1, a messaging system 10 is illustrated in FIG. 1 which enables users to view and select selective portions or precis of speech based information and then provide such selected information to certain parties identified by the users. In one embodiment, messaging system 10 has at least one voice mail server 20. While the preferred embodiment of the present invention is described and illustrated below as a messaging system having one voice mail server, the present invention may easily be implemented with two or more voice mail servers which may be in communication with one another. In this manner, voice mail server 20 may be connected via an inter-mailbox data network to other respective voice mail servers, not shown, in messaging system 10. Thus, each voice mail server would be able to communicate (e.g., transmit and receive information) with the other voice mail servers in the voice mailbox network system.

Referring again to FIG. 1, messaging system 10 is illustrated as having voice mail server 20 connected as part of a primary communications network 30, such as an intra company voice mail system. It is understood that primary communications network 30 could be a private branch exchange (PBX), Centrex, or similar communication or telecommunication system that controls access to the voice mail server 20. The primary communications network 30 connects subscribers, such as subscribers 50 and 60, in the network to the voice mail server 20.

In this embodiment, voice mail server 20 includes at least one database 40, for storing, for example, voice mail message files and voice mail message transcripts as discussed in more detail later herein, as well as the operating programs for the particular voice mail server served by database 40. Database 40 may be any type or combination of types of storage media such as magnetic, optical, optical-magnetic, etc. so long as the storage facility has sufficient capacity to store a plurality of voice mail messages from a plurality of subscribers.

In one embodiment, voice mail server 20 is preferably a computer system that essentially functions as a central answering machine for subscribers to the voice mail system. It is understood that the present invention can be utilized in or adapted to a variety of voice mail servers or similar equipment.

Voice mail server 20 is also connected via respective trunk lines, not shown, to a communications network 70, which is illustrated in FIG. 1 as preferably being the public switched telephone network. In this manner, a caller may access the voice mail server 20 via communications network 70 through use of a portable telephone 80 and/or personal computer 90 or other similar device. It is also understood that access to the voice mail server is not intended to be limited to telephones and/or personal computers, but could be, for instance, wireless devices, conventional facsimile machines, palmtops, or any other device that is capable of transmitting and receiving data over a telephone line.

In the present embodiment, voice mail server 20 is in communication with a message server 90, such as an electronic mail message server, for user in delivering messages, such as certain selections of voicemail transcripts and corresponding audio to one or more entities. As discussed in more detail later herein, voice mail server 20 processes speech files, in this case, the speech files are voicemail messages, to produce one or more voicemail transcripts. Users are then provided the opportunity to select one or more portions of a voicemail transcript. The one or more selected portions are provided to one or more identified recipients via message server 90.

Figure 2:
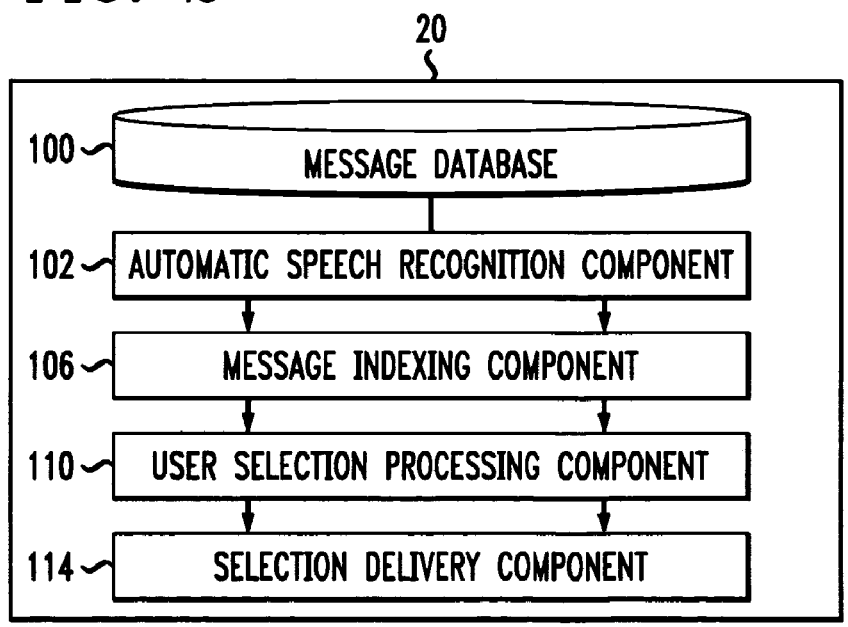
FIG. 2 illustrates an exemplary voicemail message server in accordance with the teachings of the present invention.

Referring to FIG. 2, a more detailed view of voicemail server 20 is shown. In this embodiment, voicemail server 20 includes a message database 100, an automatic speech recognition component 102, a message indexing component 106, a user selection processing component 110 and a selection delivery component 114. Typically, message database 100 receives and stores speech files, such as voicemail messages. Automatic speech recognition is performed upon these speech files by automatic speech recognition component 102 to produce transcripts of the speech files. The transcripts are then indexed by message indexing component 106 to produce a transcript index, such as shown in FIG. 3, wherein each word in the transcript is indexed relative to the occurrence of the word in the speech file. In this manner, as discussed in more detail later herein, selection of one or more words or portions of the transcripts is easily identifiable based on the indexing. User selection component 110 provides users the ability to select one or more portions of the speech transcripts. The portions selected may be noncontiguous, such as one word from one sentence, a few words from another sentence, a phone number from another section of the transcript, and other variations thereof. Once a portion or portions of a speech transcript are selected, certain desired recipients may be provided the selected portion or portions via selection delivery component 114. In one embodiment, selection delivery component 114 is an interface with a message server, such as an electronic mail message server shown in FIG. 1, which provides the selected portion or portions of a speech transcript to one or more entities as electronic mail message(s).

Figure 4:
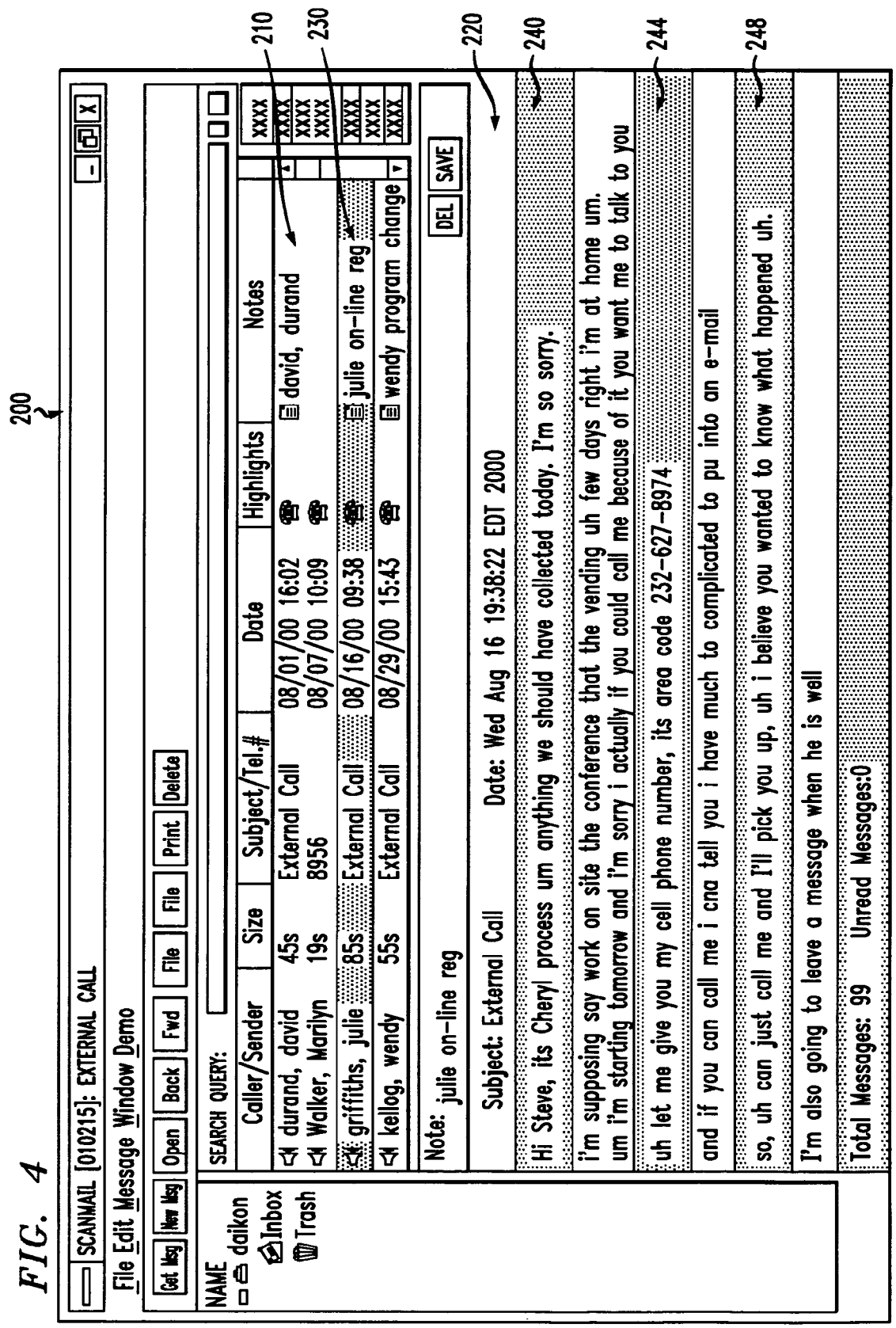
FIG. 4 illustrates an exemplary screen display in accordance with the teachings of the present invention.

Referring to FIG. 4, an exemplary user interface screen 200 as may be provided via selection delivery component 114 (FIG. 2) to one or more users is shown. Screen 200 includes a message summary section 210 and a message transcript section 220. In one embodiment, message summary section 210 provides information such as the name of the caller/sender, the size of the message, the subject/telephone number, the date and other related message information. Messages may be selected within message summary section 210, such as highlighted message 230, which provides the corresponding message transcript within message transcript section 220. From within message transcript section 220, text of the message selected within message summary section 210 is provided. A portion or portions of the transcript text may be selected within message transcript section 220, such as shown by selected noncontiguous portions 240, 244 and 248.

Figure 5:
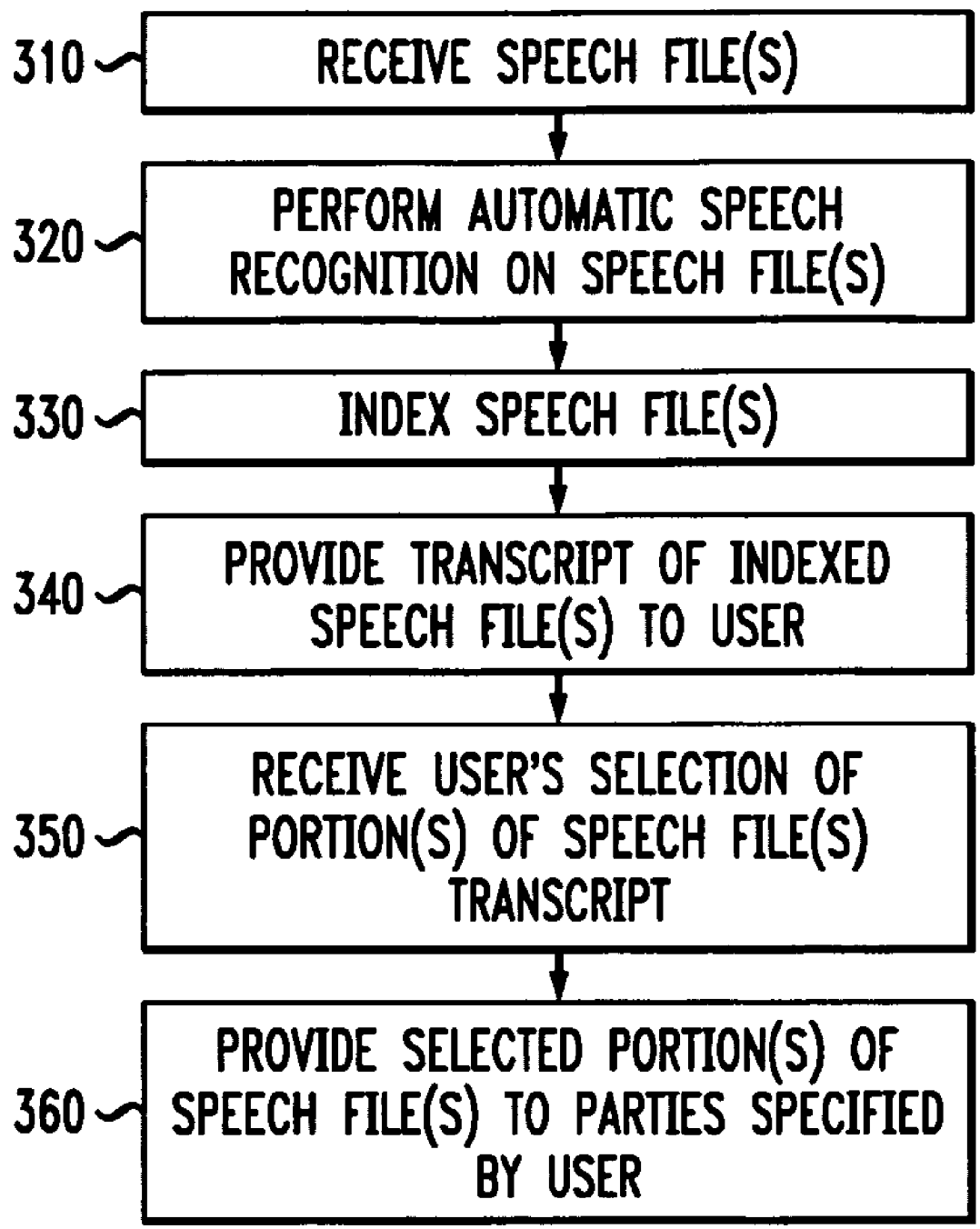
FIG. 5 illustrates an exemplary method in accordance with the teachings of the present invention.

Referring to FIG. 5, an exemplary embodiment of a method for processing speech files in accordance with the present invention is shown. In this embodiment, one or more speech file(s) are received, such as via a voicemail server discussed earlier herein, step 310. Automatic speech recognition is performed on such speech file(s), such as via an automatic speech recognition component discussed earlier herein, step 320. The speech file(s) are indexed, such as shown in FIG. 3, step 330. A transcript of the indexed speech file(s) is provided to a user, such as shown in FIG. 4, step 340. The user's selection of one or more portion(s) of the speech file(s) transcript is received, such as also shown previously in FIG. 4, step 350. The selected portion(s) of speech file transcript is provided to one or more entities or parties specified by user, step 360, such as via selection delivery component, discussed earlier herein. In one embodiment, the entities or parties may simply be electronic mail addresses or user names specified by the user to which the selected portion or portions of the transcript will be provided. The specified recipients of the transcript portion or portions may receive the portions in both a textual and an audible format. For example, the portion or portions selected may be provided as text within an electronic mail message with an attachment of an audio file which corresponds to the selected portion or portions.

In an exemplary embodiment, automatic speech recognition or simply, speech to text techniques are used to derive text from speech, i.e. to identify the letters or words spoken by a human subject in one or more speech files, such as voicemail messages. In the present invention, automatic speech recognition is used to analyze the speech signals contained in a speech file, such as a voicemail message to produce a textual transcript of the speech signals in the voicemail message. In an exemplary embodiment, such speech recognition techniques may use a combination of pattern recognition and sophisticated guessing based on some linguistic and contextual knowledge to transcribe the speech files. It is contemplated that other methodologies and techniques may be used so long as the speech is properly transcribed into a textual format to produce a workable transcript from which a user may select one or more portions to send or forward on to one or more other parties or entities.

In the present invention, transcribing of the voicemails by automatic speech recognition is preferably performed automatically, for example, as soon as a voicemail message is left for a user or alternatively, transcribing may be performed periodically as determined by the user or by system defaults. In one embodiment of the present invention, automatic speech recognition is performed in conjunction with or immediately subsequent to the recording of the voice or speech signals as voicemail messages. For example, transcribing may be performed as someone is leaving a voicemail message by transmitting the voice signals to the respective voicemail server for processing. Alternatively, transcribing may performed immediately after the voicemail is saved on the voicemail server by having the voicemail server first transmit the stored voicemail message to the speech recognition component of the voicemail server and then using automatic speech recognition to transcribe the voicemail.

Alternatively, the system may wait until a certain predetermined number of voicemails are stored for a certain user on the voicemail server before processing the voicemails. Once the certain predetermined number of voicemails is attained, processing of the voicemail messages may be performed on the group of voicemails by the speech recognition component. For example, the system may be configured to transcribe voicemail messages after at least two or more messages are left in a user's mailbox. As a further alternative, transcribing of the voicemails may be performed only after a user has actively selected for transcribing to be performed on the voicemails. For example, the user may be provided in the system with a menu selection or selection key which when pressed or selected, would initiate transcribing of their voicemails. The user may also be provided with the choice of having specific voicemails of their choosing processed by the system. In this instance, some users may prefer to listen to some of their voicemails in the conventional manner while having other voicemails, such as relatively longer voicemails, transcribed and indexed by the system. It is contemplated that the system may provide the user with the choice of having his/her voicemails processed by the system. In one embodiment, the user may be charged a certain fee for voicemail processing or alternatively, the voicemail processing may be offered as a free value added service.

Once the voicemails have been transcribed, the text of the voicemail message(s) may be indexed using full text indexing/retrieval techniques as known in the art. Once a user selects a portion or portions of a speech file transcript as described earlier herein, those selected portions are used in conjunction with the transcript index, such as the one shown in FIG. 3, to create a corresponding audio file containing only those selected portion to provide to the one or more parties the user has specified. In other words, the selected portions of the transcripts which the user has selected are extracted from the original speech file to produce a new speech file containing only the selected portions. It is contemplated that any number of indexing/retrieval techniques may be employed within the present invention to provide for more efficient and faster information retrieval of selected portions of the speech file transcripts.

In another embodiment of the present invention, a sound or audio file of the voicemail message is also provided to the one or more users. In one embodiment, the sound or audio file may be provided as an attachment to the electronic mail message. The sound or audio file may be provided as an MPEG-x Audio Layer-x (mpx) file such as an mp3 file, a .WAV file, a streaming audio file or other similar file format.

It will be apparent to those skilled in the art that many changes and substitutions can be made to the system and method described herein without departing from the spirit and scope of the invention as defined by the appended claims.

We claim:

1. A method for processing voicemail messages, the method comprising:
   transcribing a plurality of voicemail messages, only after storing a predetermined number of the plurality of voice mail messages for a certain user, to produce a plurality of voicemail message transcripts;
   indexing the plurality of voicemail message transcripts, each word in the plurality of voicemail message transcripts being indexed relative to an occurrence of a corresponding word in the plurality of voicemail messages;
   providing the plurality of voicemail message transcripts to one or more users;
   receiving at least one selection action from the one or more users, the at least one selection action identifying a portion of one or more of the voicemail message transcripts for delivery to one or more parties identified by the one or more users; and
   providing the identified portion of the one or more voicemail message transcripts to the one or more parties specified by the one or more users.

2. The method of claim 1, wherein audio files of the voicemail messages are provided to the one or more parties specified by the one or more users, the audio files corresponding to solely the portion of the voicemail message transcripts identified by the one or more users.

3. The method of claim 1, wherein the identified portion of the one or more voicemail message transcripts comprises a plurality of non-contiguous portions of the one or more voicemail message transcripts.

4. The method of claim 1, wherein the one or more voicemail message transcripts are provided as audio files selected from at least one of an mpx format, a .WAV format, or a REAL Audio format.

5. The method of claim 1, wherein the one or more voicemail message transcripts include at least one audio file, the at least one audio file containing only audio corresponding to the portion identified by the one or more users.

6. The method of claim 1, wherein providing the identified portion of the one or more voicemail message transcripts comprises providing the identified portion in an electronic mail message to the one more parties.

7. The method of claim 6, wherein the electronic mail message includes an attachment of an audio file corresponding to the identified portion.

8. A method comprising:
   processing a plurality of speech files, only after storing a predetermined number of the plurality of speech files for a certain user, to produce a plurality of indexed speech file transcripts, each word in the plurality of indexed speech file transcripts being indexed relative to an occurrence of a corresponding word in the plurality of speech files;
   receiving a selection action identifying a portion of one of the plurality of indexed speech file transcripts;
   receiving a request to deliver the identified portion of the one of the indexed speech file transcripts to one or more intended recipients; and
   providing the identified portion of the one of the indexed speech file transcripts to the one or more intended recipients.

9. The method of claim 8, wherein processing the plurality of speech files to produce a plurality of indexed speech file transcripts comprises:
   receiving the plurality of speech file transcripts;
   performing automatic speech recognition upon the speech files; and
   indexing the speech files.

10. The method of claim 8, wherein the speech files are voicemail messages.

11. The method of claim 8, further comprising:
    providing a selection facility to allow selection of non-contiguous portions of the one of the indexed speech file transcripts.

12. The method of claim 8, wherein the identified portion is provided in both a text and an audio format.

13. The method of claim 12, wherein audio files are provided as attachments to one or more electronic mail messages provided to the one or more intended recipients.

14. The method of claim 8, wherein the identified portion of the one of the plurality of indexed speech file transcripts is included as text within one or more electronic mail messages provided to the one or more intended recipients.

15. The method of claim 14, wherein the text is placed within a body of the one or more electronic mail messages.

16. A method comprising:
   transcribing a plurality of speech messages, only after storing a predetermined number of the plurality of speech messages for a certain user, to produce a plurality of speech message transcripts;
   indexing the plurality of speech message transcripts, each word in the plurality of speech message transcripts being indexed relative to an occurrence of a corresponding word in the plurality of speech messages;
   providing a selection facility for selection of a portion of at least one of the plurality of speech messages;
   receiving, from a user, a selection of a portion of the at least one speech message; and
   providing the selected portion to one or more parties specified by the user.

17. The method of claim 16, wherein transcribing the plurality of speech messages is performed by automatic speech recognition.

18. The method of claim 17, wherein the selection facility allows a selection of noncontiguous portions of the speech message.

19. The method of claim 16, wherein providing the selected portion to one or more parties specified by the user comprises:
   creating an electronic mail message containing, in an audible format, only the selected portion.

20. A system for processing voicemail messages, the system comprising:
   a message database to receive and store the voicemail messages;
   an automatic speech recognition component to perform speech recognition on the voicemail messages and produce transcripts of the voicemail messages only after a predetermined number of the voicemail messages are stored for a certain user;
   a message indexing component to produce a transcript index of the transcripts of the voicemail messages such that each word in the transcripts of the voicemail messages is indexed relative to an occurrence of a corresponding word in the voicemail messages;
   a user selection component to allow a user to select a portion of at least one of the transcripts of the voicemail messages for delivery to one or more parties; and
   a selection delivery component to provide the selected portion of the at least one of the transcripts of the voicemail messages to the one or more parties.

21. The system of claim 20, wherein the selected portion of the at least one of the transcripts of the voicemail messages includes non-contiguous portions.

22. The system of claim 20, wherein the selection delivery component is configured to interface with a message server.

23. The system of claim 22, wherein the message server is an electronic mail message server.

* * * * *